United States Patent [19]

Keck

[11] 4,223,126

[45] Sep. 16, 1980

[54] LINEAR COPOLYESTERS CONTAINING TERTIARY BUTYL ISOPHTHALIC ACID

[75] Inventor: Max H. Keck, Cuyahoga Falls, Ohio

[73] Assignee: The Goodyear Tire & Rubber Company, Akron, Ohio

[21] Appl. No.: 63,286

[22] Filed: Aug. 2, 1979

[51] Int. Cl.$^2$ ............................................. C08G 63/18
[52] U.S. Cl. ..................................... 528/305; 528/309
[58] Field of Search ................................ 528/305, 309

[56] References Cited

U.S. PATENT DOCUMENTS 2,965,613 12/1960 Milone et al. ......................... 528/305
3,365,425 1/1968 Watson .................................. 528/305

Primary Examiner—Lucille M. Phynes
Attorney, Agent, or Firm—J. P. Ward

[57] ABSTRACT

Novel compositions of matter comprising polymethylene terephthalate t-butyl isophthalate copolyesters wherein the t-butyl isophthalate repeating units range from 1 to 50 mole percent and the ethylene terephthalate repeating units range from 99 to 50 mole percent, said percentages being based on the sum of the moles of ethylene terephthalate and t-butyl isophthalate repeating units in said compositions.

10 Claims, No Drawings

LINEAR COPOLYESTERS CONTAINING TERTIARY BUTYL ISOPHTHALIC ACID

TECHNICAL FIELD

The invention relates to a new family of new copolyester resins which are copolyesters of a polymethylene glycol, terephthalic acid, and tertiary butyl isophthalic acid. This new family provides a series of resins having various properties. The resins are useful in various applications.

BACKGROUND ART

In the prior art, copolyesters of various diols with mixtures of terephthalic acid and isophthalic acid are well-known as shown in U.S. Pat. No. 2,965,613. If the isophthalic acid in the terephthalate copolyesters is replaced with tertiary butyl isophthalic acid, many unexpected advantages are gained such as: reduced tendency to crystallize, improved solubility in solvents, higher glass transition temperatures, and higher melt viscosities.

Incorporation of t-butyl isophthalic acid in the copolyesters in the place of isophthalic acid provides high glass transition temperatures. Such resins are particularly useful in applications in which it may be desirable to sterilize plastic articles made of the resins.

The incorporation of even relatively small amounts of t-butyl isophthalic acid (1 to 7 percent) provides copolyesters which have a greatly reduced tendency to crystallize. These resins are useful in molding applications. Copolyesters containing moderate amounts of t-butyl isophthalic acid are considerably more soluble than their isophthalic acid analogs. Such resins may be useful in solution coatings, solution adhesives and in melt adhesives.

In addition to new copolyester resins, the invention relates to products made of the resins, such as melt adhesives, hot melt adhesives, solutions, coatings, molded products, films and fibers.

SUMMARY OF THE INVENTION

Polyethylene terephthalate which is used for manufacture of fibers and films has high mechanical strength, low water absorption and resistance to many chemicals. For some uses polyethylene terephthalate crystallizes too rapidly. While the undesirably high crystallization tendency of polyethylene terephthalate can be reduced by replacing part of the terephthalic acid or the glycol by compounds that reduce the tendency of the resin to crystallize, most of such compounds have a deleterious effect on the other desirable properties of polymer. Furthermore, such compounds generally reduce the glass temperature of the resin and for some purposes this reduces the utility of the polymer.

Copolyesters of the invention can be prepared by ester interchange and condensation reactions. They can also be prepared by esterification of the acids with the glycol followed by condensation of the glycol esters or low polymers thereof to form high molecular weight polymers. Glycols suitable for preparation of the copolyesters of the invention are glycols of the formula $HO(CH_2)_nOH$, where n is an integer of from 2 to 6 and diethylene glycol. In addition to the t-butyl isophthalic acid, the copolyester can contain minor amounts of one or more of the following acids: isophthalic acid, o-phthalic acid, glutaric acid, adipic acid, sebacic acid, azelaic acid and dodecanedioic acid.

DETAILS OF DESCRIPTION

Ethylene terephthalate t-butyl isophthalic copolymers containing about 6 to 20 mole percent t-butyl isophthalate crystallize only on being annealed. These compositions are of special value in engineering plastic applications such as the molding of large bottles or tanks or other containers where crystallization is to be avoided. Ethylene terephthalate t-butyl isophthalate copolymers containing about 25 to 50 mole percent t-butyl isophthalic acid are more soluble than their ethylene terephthalate/isophthalate analogs and will be of use in the preparation of solution adhesives and solution coatings having improved shelf life.

As the amount of tertiary butyl isophthalate is increased in copolyesters, the glass transition temperature is increased and the melt viscosity at a given intrinsic viscosity is higher than that of an analogous copolyester of ethylene terephthalate isophthalate.

TABLE I

COPOLYMERS CONTAINING t-BUTYL ISOPHTHALATE UNITS

| Composition (moles %) | IV | Mp | Tg | Comments |
|---|---|---|---|---|
| 98/2 | .655 | — | — | |
| 97/3 ET/t-Bu Iso | .610 | 246° C. | 73° C. | Crystallizes rapidly |
| 96/4 | .860 | — | — | |
| 94/6 | .874 | 234 | 76 | Crystallizes very slowly |
| 93/7 | .742 | — | — | |
| 90/10 | .901 | 220 | 78[a] | Crystallizes only on being annealed |
| 85/15 | .656 | — | 79 | Crystallizes only on being annealed |
| 80/20 | .644 | — | 79[b] | Crystallizes only on prolonged annealing, sol. in CHCl$_3$ |
| 70/30 | .713 | — | 81[c] | Sol. in CHCl$_3$, THF, and dioxane, insol. in toluene |
| 60/40 | .590 | — | 82[d] | Sol. in toluene, MEK, Dioxane, and ethylene dichloride, insol. in heptane |
| 0/100 | .709 | 103° | 90[e] | Sol. in toluene, MEK, dioxane and CHCl$_3$ |
| 90/10 TmT/t-bu Iso. | .620 | — | — | Crystallizes rapidly-melt is extremely tacky and sticks to glass, stainless steel, and copper |
| 80/20 TmT/t-bu Iso. | .415 | — | 29 | Crystallizes slowly-melt is extremely tacky. Sol. in CHCl$_3$ and insol. in MEK |
| 70/30 TmT/t-bu Iso. | .880 | — | 45[f] | Very tough, somewhat elastic polymer. Sol. in CHCl$_3$ and insol. in MEK, dioxane and toluene. |
| 80/20 Hexamethylene | .681 | 120° | 40[g] | Very tough, somewhat elastic polymer. Sol. in CHCl$_3$ |

TABLE I-continued
COPOLYMERS CONTAINING t-BUTYL ISOPHTHALATE UNITS

| Composition (moles %) Tere/t-Bu Iso. | IV | Mp | Tg | Comments |
|---|---|---|---|---|
| | | | | and dioxane |

[a]Tg of isophthalic acid analog is 71°
[b]Tg of isophthalic acid analog is 70°
[c]Tg of isophthalic acid analog is 68°
[d]Tg of isophthalic acid analog is 66°
[e]Tg of isophthalic acid analog is 56°
[f]Tg of isophthalic acid analog is 27°
[g]Tg of isophthalic acid analog is −1°

Table I lists some of the properties of copolymers containing various amounts of tertiary butyl isophthalic acid.

BEST MODE FOR CARRYING OUT THE INVENTION

EXAMPLE I

Preparation of 97/3 ethylene terephthalate/t-butyl isophthalate copolyester

A mixture of 56.4g of dimethyl terephthalate, 43g of ethylene glycol, 0.0170g of manganese acetate, and 0.017g of antimony oxide were placed in a glass reaction tube equipped with a stirrer and a side arm with a condenser. The mixture was heated at 175°–185° C. for three hours at which time the evolution of methanol had ceased. The mixture was cooled slightly and 1.998g of t-butyl isophthalic acid were added. Further heating was carried out at 200° C. for two hours. The temperature was then raised to 235° C. for two and one-half hours after which the pressure in the system was gradually reduced to 0.2 torr over a thirty minute period. During this half hour pressure reduction period the reaction temperature was raised to 250° C. The reaction mixture was then heated under 0.2 torr pressure at 265° C. for one and one-half hours to provide a copolymer having an intrinsic viscosity of 0.610.

EXAMPLE II

Preparation of 80/20 ethylene terephthalate/t-butyl isophthalate copolyester

A mixture of 23.27g of dimethyl terephthalate, 21.4g of ethylene glycol, 0.0070g of manganese acetate, and 0.0070g of antimony oxide were placed in a glass reaction tube equipped with a stirrer and a side arm with a condenser. The mixture was heated at 185° C. for 4 hours at which point the evolution of methanol had ceased. The reaction mixture was cooled to 100° C. and 6.66g of t-butyl isophthalic acid were added. Heating was continued for 3 hours at 200° C. The mixture was then heated for one hour at 250° C. after which the pressure on the system was gradually reduced to 0.7 torr over a fifteen minute period. The reaction mixture was heated at 275° C. for one hour and forty-five minutes at 0.7 torr to provide a copolyester having an intrinsic viscosity of 0.644.

EXAMPLE III

Preparation of 70/30 tetramethylene terephthalate/t-butyl isophthalate

A mixture of 29.88g of dimethyl terephthalate, 25.8g of 1,4-butanediol, and 0.18g of catalyst solution containing 0.006% titanium as tributyl titanate in ethylene glycol, were placed in a glass reaction tube equipped with a stirrer and a sidearm with a condenser. This mixture was heated for one hour and forty-five minutes at 210° C. At the end of this time period the evolution of methanol had ceased. 14.65 grams of t-butyl isophthalic acid were added and heating was continued at 175° C. for thirty minutes. The temperature was raised to 225° C. and after fifteen minutes was raised further to 240° C. Heating was continued at 240° C. for one hour after which an additional 5g of 1,4-butanediol was added. After fifteen additional minutes at 240° C. the temperature was raised to 255° C. After thirty minutes at 255° C. pressure on the system was gradually reduced to 0.6 torr over a ten minute period. Heating was then continued at 275° C. and a 0.6 torr pressure for two and one-half hours to provide a copolyester having an intrinsic viscosity of 0.880.

The other polymers listed in Table I were prepared in the same general manner as those illustrated in Examples I, II, and III.

The invention has been particularly illustrated with respect to copolyester of ethylene glycol. t-butyl isophthalic acid copolyester of other polymethylene glycols containing up to six $CH_2$ groups have similar properties and utilities.

While certain representative embodiments and details have been shown for the purpose of illustrating the invention, it will be apparent to those skilled in this art that various changes and modifications may be made therein without departing from the spirit or scope of the invention.

I claim:

1. A polymethylene terephthalate t-butyl isophthalate copolyester in which the t-butyl isophthalate units comprise from 1 to 50 percent of the sum of the ethylene terephthalate and t-butyl isophthalate units in the copolyester and the ethylene terephthalate units comprise from 99 to 50 percent of said sum.

2. The copolyester of claim 1 in which the polymethylene glycol component is selected from the group consisting of polymethylene glycol containing 2 to 6 carbon atoms and diethylene glycol.

3. The copolyester of claim 1 in which the polymethylene glycol component is ethylene glycol.

4. An ethylene terephthalate-ethylene t-butyl isophthalate copolyester in which the ethylene terephthalate units comprise from 98 to 93 percent of the sum of the ethylene terephthalate and ethylene t-butyl isophthalate units in the copolyester and the t-butyl isophthalate units comprise from 2 to 7 percent of said sum.

5. An ethylene terephthalate alkylene t-butyl isophthalate copolyester in which the alkylene terephthalate units comprise from 75 to 50 percent of the sum of the ethylene terephthalate and alkylene t-butyl isophthalate units in the copolyester and the alkylene t-butyl isophthalate units comprise from 25 to 50 percent of said sum.

6. The copolyester of claim 4 in the form of a fiber.

7. The copolyester of claim 4 in the form of an oriented fiber.

8. The copolyester of claim 4 in the form of a molded article.

9. The copolyester of claim 4 in the form of a parison.

10. The copolyester of claim 5 in the form of a solution.

* * * * *